United States Patent
Jain et al.

(10) Patent No.: US 12,524,268 B2
(45) Date of Patent: Jan. 13, 2026

(54) METHODS FOR CONTROLLING ACCESS TO SHARED CONFIGURATION IN A ROLE-BASED, MULTI-ADMIN CENTRALIZED OR DISTRIBUTED SYSTEM AND DEVICES THEREOF

(71) Applicant: F5, Inc., Seattle, WA (US)

(72) Inventors: Sanjay Jain, San Jose, CA (US); Swapnil Mhatre, San Jose, CA (US)

(73) Assignee: F5, Inc., Seattle, WA (US)

(*) Notice: Subject to any disclaimer, the term of this patent is extended or adjusted under 35 U.S.C. 154(b) by 87 days.

(21) Appl. No.: 18/090,928

(22) Filed: Dec. 29, 2022

(65) Prior Publication Data

US 2025/0315294 A1    Oct. 9, 2025

Related U.S. Application Data

(60) Provisional application No. 63/411,933, filed on Sep. 30, 2022.

(51) Int. Cl.
*G06F 9/50* (2006.01)
*G06Q 10/06* (2023.01)
(Continued)

(52) U.S. Cl.
CPC .............. *G06F 9/50* (2013.01); *G06Q 10/06* (2013.01); *H04L 9/0819* (2013.01);
(Continued)

(58) Field of Classification Search
CPC .......... G06F 9/50; G06F 15/7871; G06F 8/71; G06F 8/65; G06F 9/44521;
(Continued)

(56) References Cited

U.S. PATENT DOCUMENTS 7,987,269 B1 * 7/2011 Mayhead ............... G06Q 10/06
709/218
8,214,887 B2    7/2012 Clark
(Continued)

FOREIGN PATENT DOCUMENTS

CN      113760383 A  * 12/2021
WO    2010043722 A1    4/2010

OTHER PUBLICATIONS

European Search Report for corresponding European Application No. 20156087.7; mailed Mar. 27, 2020; 5 pages.
(Continued)

*Primary Examiner* — Kyung H Shin
(74) *Attorney, Agent, or Firm* — Troutman Pepper Locke LLP

(57) ABSTRACT

Methods, non-transitory computer readable media, network traffic management apparatuses, central management devices, and network traffic management systems that control access to configuration data in a distributed system are illustrated. With this technology, a set of configuration data is stored in a first data structure and a corresponding set of configuration data is stored in a second data structure along with an encrypted digest value that was encrypted using a private key associated with a particular administrator role. The stored configuration data and/or newly received modifications to stored configuration data can be authenticated via a comparison of a digest value calculated using the configuration data compared to the stored encrypted digest value, which is decrypted with a stored public key corresponding to the administrator role. Accordingly, configuration data can be securely controlled by authenticating it as valid in accordance with authorized administrator roles prior to being updated or loaded.

20 Claims, 8 Drawing Sheets

(51) Int. Cl.
*H04L 9/08* (2006.01)
*H04L 9/30* (2006.01)
*H04L 41/0895* (2022.01)
*H04L 61/45* (2022.01)

(52) U.S. Cl.
CPC .............. *H04L 9/0894* (2013.01); *H04L 9/30* (2013.01); *H04L 41/0895* (2022.05); *H04L 61/45* (2022.05)

(58) Field of Classification Search
CPC .............. G06F 9/44505; H04L 63/0428; H04L 9/3247; H04L 41/0895; H04L 41/12; H04L 41/40; H04L 41/0806; H04L 67/34; H04L 45/04; H04L 41/5051; H04L 67/562; H04L 41/122; H04L 47/2441; H04L 45/74; H04L 61/45; H04L 9/088; H04L 61/3025; H04L 9/50; H04L 9/30; H04L 61/10; G06Q 10/06
See application file for complete search history.

(56) References Cited

U.S. PATENT DOCUMENTS

| | | | |
|---|---|---|---|
| 8,943,548 | B2 | 1/2015 | Drokov et al. |
| 8,996,857 | B1 | 3/2015 | Akella |
| 9,225,794 | B2 | 12/2015 | Roskind |
| 9,985,786 | B1 | 5/2018 | Bhabbur et al. |
| 10,169,937 | B1 | 1/2019 | Zwink |
| 10,382,426 | B2 | 8/2019 | Falodiya |
| 10,803,164 | B2 | 10/2020 | McClintock |
| 10,972,453 | B1 | 4/2021 | Natarajan |
| 2001/0034771 | A1 | 10/2001 | Hutsch et al. |
| 2003/0115461 | A1 | 6/2003 | O'Neill |
| 2003/0163733 | A1 | 8/2003 | Barriga-Caceres |
| 2005/0216421 | A1 | 9/2005 | Barry et al. |
| 2006/0021016 | A1 | 1/2006 | Birk |
| 2006/0031407 | A1 | 2/2006 | Dispensa et al. |
| 2007/0249288 | A1 | 10/2007 | Moallemi et al. |
| 2008/0021997 | A1 | 1/2008 | Hinton |
| 2011/0004117 | A1 | 1/2011 | Neville et al. |
| 2014/0162685 | A1 | 6/2014 | Edge |
| 2014/0337954 | A1 | 11/2014 | Ahmed |
| 2015/0082427 | A1 | 3/2015 | Ivanchykhin et al. |
| 2015/0149767 | A1 | 5/2015 | Qualha et al. |
| 2015/0195243 | A1 | 7/2015 | Roskind |
| 2016/0021097 | A1 | 1/2016 | Shrotri |
| 2016/0057140 | A1 | 2/2016 | Heeler |
| 2017/0346815 | A1 | 11/2017 | Andrews et al. |
| 2018/0091484 | A1* | 3/2018 | Atta .......................... G06F 9/50 |
| 2018/0167378 | A1 | 6/2018 | Kostyukov |
| 2018/0219762 | A1* | 8/2018 | Wang .................. H04L 41/0895 |
| 2018/0219854 | A1 | 8/2018 | Miran et al. |
| 2019/0036934 | A1 | 1/2019 | Pitchaimani et al. |
| 2019/0238554 | A1 | 8/2019 | Disraeli |
| 2020/0034521 | A1 | 1/2020 | Teng et al. |
| 2020/0092181 | A1 | 3/2020 | Thiagarajan et al. |
| 2020/0137048 | A1 | 4/2020 | Doner |
| 2021/0389941 | A1 | 12/2021 | Delville |
| 2022/0103370 | A1* | 3/2022 | Alwen .................... H04L 61/45 |

OTHER PUBLICATIONS

F5 Networks Inc.; BIG-IP® Access Policy Manager® Authentication and Single Sign-On; manual; manual; Version 13.1; F5 Networks, Inc.; Oct. 22, 2018; 394 pages.

F5 Networks Inc.; "BIG-IP® Access Policy Manager® Customization"; Version 13.1, F5 Networks, Inc.; Nov. 15, 2017; 106 pages.

F5 Networks Inc.; "BIG-IP® Access Policy Manager® Implementations"; Version 13.1; F5 Networks, Inc.; manual; Nov. 15, 2017; 136 pages.

F5 Networks Inc.; "BIG-IP® Access Policy Manager® Network Access"; manual; Version 13.1, F5 Networks, Inc.; Apr. 23, 2018; 104 pages.

F5 Networks Inc.; "BIG-IP® Access Policy Manager® Portal Access"; manual; Version 13.1; F5 Networks, Inc.; Nov. 15, 2017; 80 pages.

F5 Networks Inc.; "BIG-IP@ Access Policy Manager® Secure Web Gateway"; manual; Version 13.1; F5 Networks, Inc.; Aug. 16, 2018; 150 pages.

F5 Networks Inc.; "BIG-IP® Access Policy Manager®: Application Access"; manual; Version 13.1; F5 Networks, Inc.; Nov. 15, 2017; 66 pages.

Microsoft, What are authentication methods?, available at: https://docs.microsoft.com/en-us/azure/active-directory/authentication/concept-authentication-passwordless; Aug. 4, 2019; 11 pages.

Microsoft, What is passwordless?, available at: https://docs.microsoft.com/en-us/azure/active-directory/authentication/concept-authentication-passwordless; Aug. 15, 2019; 9 pages.

Wang et al., "SoundAuth: Secure Zero-Effort Two-Factor Authentication Based on Audio Signals", Jun. 2018, 9 pages (Year: 2018).

International Application No. PCT/US2023/033487. International Search Report and the Written Opinion of the International Searching Authority dated Jan. 5, 2024.

International Search Report dated Apr. 26, 2023 issued in International Application No. PCT/US23/11944.

* cited by examiner

318

| Device Key ID | Device Key | Device Key |
|---|---|---|
| CMDk1 | CMD1 | pubCMD1 |
| NTMAk1 | NTMA1 | pubNTMA1 |
| CMDk2 | CMD2 | pubCMD2 |

FIG. 4C

METHODS FOR CONTROLLING ACCESS TO SHARED CONFIGURATION IN A ROLE-BASED, MULTI-ADMIN CENTRALIZED OR DISTRIBUTED SYSTEM AND DEVICES THEREOF

CROSS-REFERENCE TO RELATED APPLICATIONS

This application claims priority to U.S. Provisional Patent Application No. 63/411,933, filed Sep. 30, 2022, which is incorporated by reference herein in its entirety.

FIELD

This technology relates to methods and systems for controlling access to configuration data in a multi-admin system.

BACKGROUND

In a distributed system, multiple systems and/or devices may participate in a system to accomplish a solution. To manage these multiple systems, different administrators can be assigned that each have a very specific role for management of a specific sub-system or domain. For example, a security administrator can be responsible for administering security configurations and policies, a network administrator can be responsible for administering network setup, configurations and policies, a mobile applications manager can be responsible for administering configurations and policies for mobile device management, and so on.

In some designs, configuration management can be distributed across multiple devices, such as one or more network traffic management apparatus, central management devices, or other devices. Configuration management can also be distributed to different roles, which may or may not be on the same device.

For example, a network may be administered from a network traffic management apparatus by a network administrator, whereas security management related policies and configuration may be administered from a central management device by a security administrator. However, these two pieces, the network configuration and the security configuration, may be stored in the same storage, such as a storage of the network traffic management apparatus, thereby making the security configuration visible to the network administrator and the network configurations visible to the security administrator. In this case, any administrator on the network traffic management apparatus may be able to view and modify a configuration that is stored on the device, but that is under the domain/jurisdiction of an administrator of another device. For example, a network administrator of the network traffic management apparatus may be able to view and change a security configuration that is the responsibility of a security administrator of a central management device. While it may be advantageous to let other administrators view configurations outside of their jurisdiction because, for example, they may want to copy a particular portion of a configuration, it presents security and system integrity risks to allow system administrators to modify configurations and policies that are outside of their jurisdiction. For example, allowing a network administrator to modify security configurations that are outside their domain and for which someone else is responsible can present a significant security risk.

Therefore, it is desirable to create a system for controlling access to configurations in a distributed system to prevent unauthorized modifications of a configuration object owned by a different administrator-role.

SUMMARY

A method for controlling access to configuration data in a multi-admin system implemented by one or more network traffic management apparatuses, central management devices, server devices or client devices that includes storing a first set of configuration data in a first entry of a first data structure. In a first entry of a second data structure, a second set of configuration data and an encrypted digest value of the second set of configuration data is stored. The first of configuration data and the second set of configuration data are associated with a first administrative domain. A calculated digest value for the first set of configuration data is determined. A decrypted digest value is determined by decrypting the encrypted digest value of the second set of configuration data. Responsive to determining that the calculated digest value matches the decrypted digest value based on a comparison of the decrypted digest value to the calculated digest value, the first set of configuration data is loaded.

A network traffic management apparatus including memory including programmed instructions stored thereon and one or more processors configured to be capable of executing the stored programmed instructions to store a first set of configuration data in a first entry of a first data structure. In a first entry of a second data structure, a second set of configuration data and an encrypted digest value of the second set of configuration data is stored. The first of configuration data and the second set of configuration data are associated with a first administrative domain. A calculated digest value for the first set of configuration data is determined. A decrypted digest value is determined by decrypting the encrypted digest value of the second set of configuration data. Responsive to determining that the calculated digest value matches the decrypted digest value based on a comparison of the decrypted digest value to the calculated digest value, the first set of configuration data is loaded.

A non-transitory computer readable medium having stored thereon instructions for including executable code that, when executed by one or more processors, causes the processors to store a first set of configuration data in a first entry of a first data structure. In a first entry of a second data structure, a second set of configuration data and an encrypted digest value of the second set of configuration data is stored. The first of configuration data and the second set of configuration data are associated with a first administrative domain. A calculated digest value for the first set of configuration data is determined. A decrypted digest value is determined by decrypting the encrypted digest value of the second set of configuration data. Responsive to determining that the calculated digest value matches the decrypted digest value based on a comparison of the decrypted digest value to the calculated digest value, the first set of configuration data is loaded.

A network traffic management system includes one or more traffic management apparatuses, central management devices, server devices or client devices with memory comprising programmed instructions stored thereon, and one or more processors configured to be capable of executing the stored programmed instructions to store a first set of configuration data in a first entry of a first data structure. In a first entry of a second data structure, a second set of configuration data and an encrypted digest value of the second set of configuration data is stored. The first of configuration data and the second set of configuration data are associated with a first administrative domain. A calculated digest value for the first set of configuration data is determined. A decrypted digest value is determined by decrypting the encrypted digest value of the second set of configuration data. Responsive to determining that the calculated digest value matches the decrypted digest value based on a comparison of the decrypted digest value to the calculated digest value, the first set of configuration data is loaded.

This technology provides a number of advantages including providing methods, non-transitory computer readable media, network traffic management apparatuses, and network traffic management systems that help to control access to configuration data in a multi-admin system.

BRIEF DESCRIPTION OF THE DRAWINGS

FIG. 4C is an example of a key metadata storage structure of a network traffic management apparatus;

DETAILED DESCRIPTION

Figure 1:
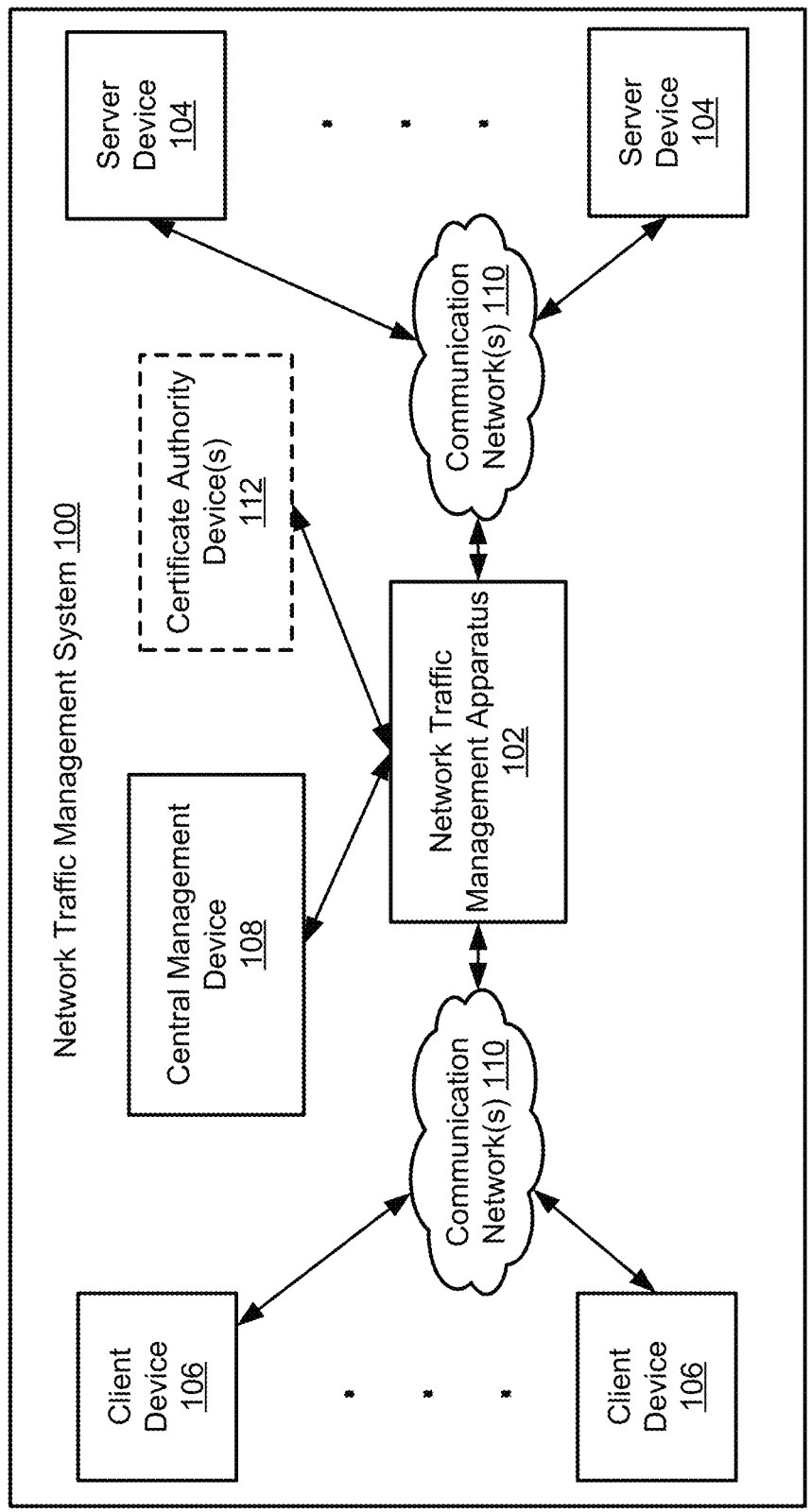
FIG. 1 is block diagram of an exemplary network traffic management system.

Referring to FIG. 1, an exemplary network traffic management system 100 is illustrated. The network traffic management system 100 in this example includes a network traffic management apparatus 102 that is coupled to server devices 104, client devices 106, and a central management device 108 via communication network(s) 110, although the network traffic management apparatus 102, server devices, client devices 106, and central management device 108 may be coupled together via other topologies. The network traffic management system 100 may include or be coupled with a certificate authority device 112 or devices. The network traffic management system 100 also may include other network devices such as routers or switches, for example, which are known in the art and thus will not be described herein. This technology provides a number of advantages including methods, non-transitory computer readable media, network traffic management systems 100, and central management devices 108 that provide for controlled access to configuration data that allows for configuration data to be publicly displayed within the system while restricting the ability to modify the data to particular administrators who are preauthorized to access and modify select data in relation to their role.

In this particular example, the network traffic management apparatus 102, server devices 104, client devices 106, central management device 108 are disclosed in FIG. 1 as dedicated hardware devices. However, one or more of the network traffic management apparatus 102, server devices 104, client devices 106, or central management device 108 can also be implemented in software within one or more other devices in the network traffic management system 100. For example, the network traffic management apparatus 102 can be hosted by one or more of the server devices 104 and/or the central management device 108 can be hosted by the network traffic management apparatus 102, and other network configurations can also be used. Although the description herein is generally directed to a system that is distributed across multiple devices, it should be understood that it is contemplated that the techniques disclosed herein could alternatively be adapted for use on a centralized system.

Figure 2:
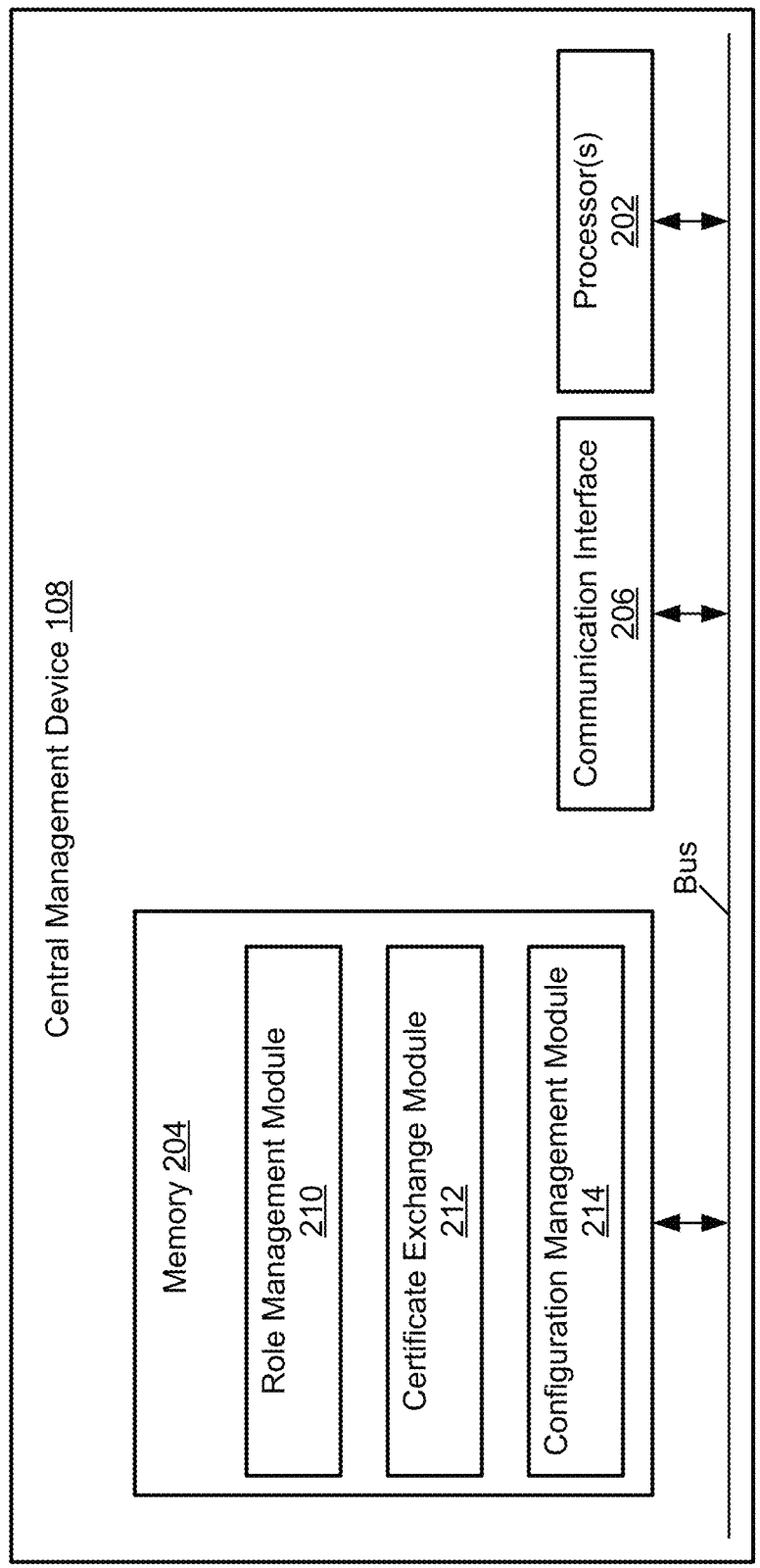
FIG. 2 is a block diagram of an exemplary central management device.

Referring to FIGS. 1-2, the central management device 108 of the network traffic management system 100 may perform any number of functions including managing and modifying configurations uniformly across multiple traffic management systems, for example. The central management device 108 in this example includes processor(s) 202, a memory 204, and a communication interface 206, which are coupled together by a bus, although the central management device 108 can include other types or numbers of elements in other configurations.

The processor(s) 202 of the central management device 108 may execute programmed instructions stored in the memory 204 of the network traffic management apparatus 102 for any number of functions described and illustrated herein. The processor(s) 202 of the central management device 108 may include one or more central processing units (CPUs) or general purpose processors with one or more processing cores, for example, although other types of processor(s) can also be used.

The memory 204 of the central management device 108 stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the processor(s), can be used for the memory.

Accordingly, the memory of the central management device 108 can store one or more modules that can include computer executable instructions that, when executed by the central management device 108, cause the central management device 108 to perform actions, such as to transmit, receive, or otherwise process network messages, for example, and to perform other actions described and illustrated below with reference to FIGS. 4-6. The modules can be implemented as components of other modules. Further, the modules can be implemented as applications, operating system extensions, plugins, or the like.

Even further, the modules may be operative in a cloud-based computing environment. The modules can be executed within or as virtual machine(s) or virtual server(s) that may be managed in a cloud-based computing environment. Also, the modules, and even the central management device 108 itself, may be located in virtual server(s) running in a cloud-based computing environment rather than being tied to one or more specific physical network computing devices. Also, the modules may be running in one or more VMs executing on the central management device 108. Additionally, in one or more examples of this technology, virtual machine(s) running on the central management device 108 may be managed or supervised by a hypervisor.

In this particular example, the memory of the central management device 108 includes a role management module 210. According to some examples, the role management module 210 can define one or more administrative accounts based on administrative roles, administrative domains and/or particular devices used for administration of the network traffic management system 100. For example, the role management module 210 may define accounts for one or more security administrator roles associated with corresponding security domains, one or more network administrator roles associated with corresponding network domains, and so on for any other type of administrative role that may be desired or needed in the network traffic management system 100. For example, a first security administrator may have responsibility for the security policies, configurations and/or settings (collectively referred to herein as "configuration data") relating to a first domain (e.g., network security), whereas a second security administrator may have responsibility for a completely separate set of security policies, configurations and/or settings relating to a second domain (e.g., mobile device application security). In some examples, the role management module 210 may be embodied in a software application that allows a user to manually input information to define each administrator role, may import data defining each administrator role from another device or program, or a combination of the two. Each administrative account can be associated with a particular administrative role, a particular user and/or a particular device, such that access to the account is limited to that administrative role, user and/or device.

For each administrative account, the role management module 210 will create (or cause to be created) and associate an encryption key pair with the administrative account. As will be understood by those of skill in the art, an encryption key is a random string of bits that can be used to scramble and/or unscramble data. The encryption key pair includes a private key and a corresponding public key. The administrator of the account can use the private key to encrypt data that can only be properly decrypted by the associated public key. The central management device 108 will securely store the private key of each administrator account and control access to it in a manner such that only the particular administrator and/or device that is associated with the administrator account can access and utilize the private key. In this way, it can be determined that any data that is properly decrypted by a public key associated with a particular administrator account must have been encrypted by the individual and/or device that is authorized to administer that account and no one else.

The memory 204 of the central management device 108 can also include a certificate exchange module 212. The certificate exchange module 212 in this example facilitates the exchange of security certificates to establish a trusted communication channel with another device, such as with a network traffic management apparatus 102. In particular, the certificate exchange module 212 can manage the exchange of public keys between the central management device 108 and the network traffic management apparatus 102. As will be appreciated by those of skill in the art, in some embodiments, a third-party certificate authority (e.g., via certificate authority device(s) 112) may be utilized to facilitate creation of a trusted communication channel and/or exchange of public keys between devices such as the central management device 108 and the network traffic management apparatus 102. In other embodiments, trust can be established between such devices using self-signed certificates.

According to some examples, the central management device 108 and/or the network traffic management apparatus 102 may initiate a discovery process wherein the devices detect the existence of one another. This discovery process can be triggered by one of the devices booting up, can be triggered manually by a super-administrator (or other authorized user) or can be triggered as a result of another software process running on the device. The certificate exchange module 212 may trigger an exchange of security certificates as a result of this discovery process if one device newly discovers another device or newly determines that a new configuration object has been created that needs to be managed by the network traffic management system 100.

The memory 204 of the central management device 108 can also include a configuration management module 214, which can allow an administrator to input and/or modify configuration data associated with the domain for which they are responsible. In some examples, the configuration management module 214 can be a software application with a user interface that allows an administrator to input configuration data. For example, the configuration module can allow a security administrator to input changes to a security configuration for the domain that the security administrator is responsible for.

The configuration management module 214 can also create a digest of any configuration data input by an administrator. For example, in some embodiments, the configuration management module 214 can generate an MD5 digest of any set of configuration data. As will be understood by those of skill in the art, the MD5 message digest algorithm is a hash function that can be applied to a string of data of any length to produce a 128-bit hash value that can be used as a checksum to verify that data has not been corrupted. It should also be understood that although MD5 is described herein as an example hash function that can be used by the system, the disclosure is not so limited, and it is contemplated that any suitable hash function or other algorithm can be used to create a fixed length value from the configuration data that can be used to verify the integrity of the data. In this particular example, the configuration management module 214 will utilize the private key of the administrator to encrypt the digest value of the configuration data input by the administrator. As will be described in greater detail below with reference to FIG. 5, the central management device 108 can then transmit the configuration data and the associated encrypted digest value to the network traffic management apparatus 102 to store the configuration data at the network traffic management apparatus 102. By sending the configuration data along with the digest value encrypted using the private key of the administrator associated with the domain to which the configuration data relates, changes to the configuration data can be validated to have been made by the appropriate authorized administrator, thereby preventing changes by unauthorized administrators.

The communication interface 206 of the central management device 108 operatively couples and communicates between the central management device 108, the network traffic management apparatus 102, and optionally the certificate authority device 112, which are coupled together at least in part by the communication network(s) 110, although other types or numbers of communication networks or systems with other types or numbers of connections or configurations to other devices or elements can also be used.

Referring back to FIG. 1 and FIG. 3, the network traffic management apparatus 102 of the network traffic management system 100 may perform any number of functions, including providing network security, load balancing network traffic across the server devices 104, proxying connections between the client devices 106 and server devices 104, or storing configuration data to be loaded by one or more devices of the network traffic management system 100. The network traffic management apparatus 102 in this example includes processor(s) 302, a memory 304, and a communication interface 306, which are coupled together by a bus, although the network traffic management apparatus 102 can include other types or numbers of elements in other configurations.

The processor(s) 302 of the network traffic management apparatus 102 may execute programmed instructions stored in the memory 304 of the network traffic management apparatus 102 for any number of functions described and illustrated herein. The processor(s) of the network traffic management apparatus 102 may include one or more central processing units (CPUs) or general-purpose processors with one or more processing cores, for example, although other types of processor(s) can also be used.

The memory 304 of the network traffic management apparatus 102 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

Accordingly, the memory 304 of the network traffic management apparatus 102 can store one or more modules that can include computer executable instructions that, when executed by the network traffic management apparatus, cause the network traffic management apparatus 102 to perform actions, such as to transmit, receive, or otherwise process network messages, for example, and to perform other actions described and illustrated below with reference to FIGS. 4-7. The modules can be implemented as components of other modules. Further, the modules can be implemented as applications, operating system extensions, plugins, or the like.

Even further, the modules may be operative in a cloud-based computing environment. The modules can be executed within or as virtual machine(s) or virtual server(s) that may be managed in a cloud-based computing environment. Also, the modules, and even the network traffic management apparatus 102 itself, may be located in virtual server(s) running in a cloud-based computing environment rather than being tied to one or more specific physical network computing devices. Also, the modules may be running in one or more virtual machines (VMs) executing on the network traffic management apparatus 102. Additionally, in one or more examples of this technology, virtual machine(s) running on the network traffic management apparatus 102 may be managed or supervised by a hypervisor.

Figure 3:
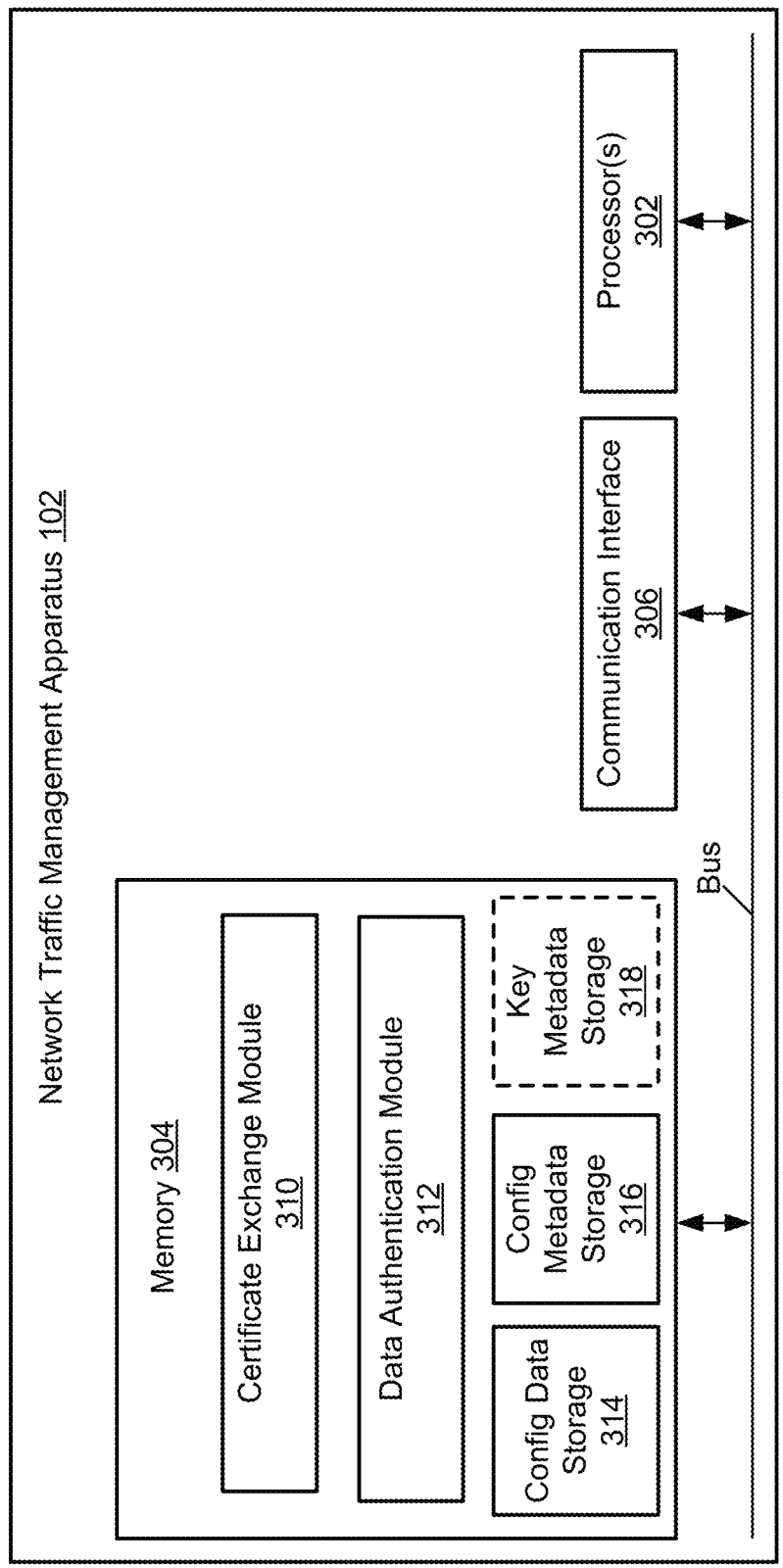
FIG. 3 is a block diagram of an exemplary network traffic manager apparatus.

In this particular example, the memory of network traffic management apparatus 102 can include a certificate exchange module 310, a data authentication module 312, and one or more data storage structures, such as a configuration data storage structure 314, a configuration metadata storage structure 316 and a key metadata storage structure 318, as shown in FIG. 3.

The certificate exchange module 310 in this example facilitates the exchange of security certificates to establish a trusted communication channel with another device, such as with a central management device 108. In particular, the certificate exchange module 310 can manage the receipt and storage of public keys from other devices (such as central management device 108) as well as managing the creation, storage and/or use of keys (e.g., private keys) created and used by the network traffic management apparatus 102. As will be appreciated by those of skill in the art, in some embodiments, a third-party certificate authority may be utilized to facilitate creation of a trusted communication channel and/or exchange of public keys between devices such as the network traffic management apparatus 102 and the central management device 108. In other embodiments trust can be established using self-signed certificates.

The data authentication module 312 in this example acts to verify that configuration data submitted to the network traffic management apparatus 102 for storage (e.g., by central management device 108) is authentic. In other words, if network traffic management apparatus 102 receives, for example, a new security configuration purportedly from a security administrator of the central management device 108, the authentication module can verify that it was actually sent from that security administrator and not an imposter, as will be described in greater detail below with reference to FIG. 5. The data authentication module 312 can calculate a digest of newly received configuration data associated with a purported administrator role, utilize a stored public key that is associated with the administrator role to decrypt an encrypted digest value received along with the configuration data and authenticate whether the configuration data is authentic based on whether the calculated digest value matches the decrypted digest value.

In some examples in which an extra layer of security is desired, the data authentication module 312 can also create a digest value of the configuration data that is encrypted using a public key of the network traffic management system 100. This second digest value can later be decrypted by the network traffic management apparatus 102 using a stored private key of the network traffic management apparatus 102 to verify that metadata associated with the configuration data has not been modified in an authorized fashion by a local user of the network traffic management apparatus 102 because the decrypted value of the second digest value should match both a calculated value of the configuration data and a decrypted value of a digest value that was decrypted using a stored private key associated with the administrator who submitted the configuration data when there have been no unauthorized changes.

Figure 4B:
FIG. 4B is an example of a configuration metadata storage structure of a network traffic management apparatus.
Figure 4A:
FIG. 4A is an example of a configuration data storage structure of a network traffic management apparatus.

Referring to FIGS. 3 and 4A-4B, the memory of network traffic management apparatus 102 can include various data storage structures such as, for example, a configuration data storage structure 314, a configuration metadata storage structure 316, and a key metadata storage structure 318. As will be appreciated by those of skill in the art, a data storage structure can be a table, a spreadsheet, a database, or any other suitable such means of storing data entries. FIG. 4A illustrates an example of a configuration data storage structure 314 that depicts three data entries relating to a first security policy, a first network configuration and a second security policy. Each entry of the configuration data storage structure 314 can include a Configuration Object ID field that identifies the domain of the configuration data (E.g., security policy 1) and a Configuration field that stores the configuration data associated with the domain. According to some embodiments, the configuration data storage structure 314 can be public, meaning that the configurations stored by the configuration data storage structure 314 may be viewable by users of the network traffic management apparatus 102 who are not responsible for or authorized to change some or all of the displayed configuration data. This is useful because it allows administrators to view configuration data of other domains, which can allow them to copy useful configurations when applicable to their own administrative domain.

As shown in FIGS. 3 and 4B, the network traffic management apparatus 102 also includes a configuration metadata storage structure 316. The configuration metadata storage structure 316 will have a number of entries that correspond to the entries in the configuration data storage structure 314. In other words, for every entry in the configuration data storage structure 314, the network traffic management apparatus 102 will store metadata associated with the configuration data in the configuration metadata storage structure 316. For example, as shown in FIG. 4B, in some embodiments, the configuration metadata storage structure 316 can include one or more fields that include a Configuration Object ID field, a Configuration field, a Digest field and a Device Key ID field. The Configuration Object ID field identifies the domain of the configuration data and associates the entry of the configuration metadata storage structure 316 with the corresponding entry in the configuration data storage structure 314. The Configuration field can store a copy of the configuration data that can be used to restore the configuration data in the configuration data storage structure 314 if, for example, it is determined to have been changed by an unauthorized user. In some examples, a copy of the configuration data may not be included in the configuration metadata storage structure 316 but may be stored elsewhere in the network traffic management apparatus 102, such as for example, a storage structure that stores versions and/or historical changes to the configuration data.

The Digest field can store one or more digests of the associated configuration data. For example, as shown in FIG. 4B, "digest(SP1)" represents a digest value of "Security_policy_1". The Digest field can store an encrypted digest that has been received from the central management device 108 in association with received configuration data and that has been encrypted with the private key of the associated administrator role of the central management device 108. In some embodiments, the Digest field can also include (or alternatively a separate, second Digest field can include) a second digest value that was calculated based on the configuration data and was encrypted using a public key of the network traffic management apparatus 102. This second digest value can provide further security by providing a check against data in the configuration metadata storage structure 316 (e.g., the first digest) having been manually updated by an administrator or others who have access to the configuration metadata storage structure 316. Unlike the configuration data storage structure 314, which is public, it is contemplated that the configuration metadata storage structure 316 will not public and therefore will not generally be accessible or viewable by most users. However, although it will be hidden from most users, there will nonetheless still be at least one or more users or administrators that will have knowledge of and access to the configuration metadata storage structure 316 and thus there is still a risk that such a user might be able to manually make changes to data in the metadata storage structures. However, use of a public key that is associated with the network traffic management apparatus 102 to encrypt a second digest value can provide protection against manual tampering of the data at the network traffic management apparatus 102. The corresponding private key of the network traffic management apparatus 102 that will be used to decrypt data encrypted using the public key of the network traffic management apparatus 102 can be hardcoded into the system or otherwise stored in a location such that it will not be accessible to users of the system to prevent tampering.

The Device Key ID field can provide an identification of a device key that is needed to decrypt the digest stored in the Digest field. For example, as shown in the first entry of FIG. 4B, a device key ID of "CMDk1" may indicate that public key 1 of the central management device 108 is needed to decrypt the digest stored in the Digest field of the first entry of the configuration data metadata storage structure. This Device Key ID field can provide a pointer to a corresponding field of the key metadata storage structure 318.

As shown in FIG. 4C, each entry of the key metadata storage structure 318 corresponds to respective entries in the configuration data storage structure 314 and the configuration metadata storage structure 316, which are linked by the Device Key Id fields and the Configuration Object Id fields. Using the Key field, the key metadata storage structure 318 can store a public key (or alternatively a pointer to a public key that is stored elsewhere) that corresponds to the domain of the configuration object associated with the configuration data of the associated entry. The stored public key will correspond to the private key that was used to encrypt the digest stored in the configuration metadata storage structure 316, provided that the digest was encrypted by the administrator role/account that is authorized to make changes to the data of the domain and not some other unauthorized administrator. For example, if security administrator 1 of the central management device 108 submitted a change to security_policy_1 such that the digest value was encrypted using the private key of security administrator 1, then the key in the Key field of the corresponding entry of the key metadata storage structure 318, which is the corresponding public key of security administrator 1, can be used to properly decrypt the digest value stored in the corresponding entry of the configuration metadata storage structure 316 and authenticate the Security_policy_1 configuration data. The Device field of the key metadata storage structure 318 can be used to identify which device stored key in the Key field originated from.

By storing the data in separate data storage structures, such as the configuration data storage structure 314, configuration metadata storage structure 316 and/or the key metadata storage structure 318, the system allows for configuration data to be publicly viewed and copied by other administrators, but provides security to prevent unauthorized changes to the configuration data by administrators who are not authorized to do so as most users will not be able to view or access metadata storage structures. As described herein, if an unauthorized change is made to one of the data storage structures, incongruencies between the data in the other corresponding data storage structures will allow the system to detect that an unauthorized change has occurred and remedy it. Although examples herein are described with respect to use of a configuration data storage structure 314, a configuration metadata storage structure 316 and a key metadata storage structure 318, it will be understood that this is merely exemplary and a number of data storage structures and/or fields can be split up and/or combined in different embodiments (e.g., in one example the configuration metadata storage structure 316 and the key metadata storage structure 318 could be combined into one data storage structure to for example, reduce the cost of storage).

Referring back to FIGS. 1 and 3, the communication interface of the network traffic management apparatus 102 operatively couples and communicates between the network traffic management apparatus 102, central management device 108, certificate authority device 112, server devices 104, client devices 106, and administrator devices which are coupled together at least in part by the communication network(s) 110, although other types or numbers of communication networks or systems with other types or numbers of connections or configurations to other devices or elements can also be used.

By way of example only, the communication network(s) 110 can include local area network(s) (LAN(s)) or wide area network(s) (WAN(s)), and can use TCP/IP over Ethernet and industry-standard protocols, although other types or numbers of protocols or communication networks can be used. The communication network(s) 110 in this example can employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

While the network traffic management apparatus 102 is illustrated in this example as including a single device, the network traffic management apparatus 102 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 102.

Additionally, one or more of the devices that together comprise the network traffic management apparatus 102 in other examples can be standalone devices or integrated with one or more other devices or apparatuses, such as one or more of the server devices 104, for example. Moreover, one or more of the devices of the network traffic management apparatus 102 in these examples can be in a same or a different communication network including one or more public, private, or cloud networks, for example.

Each of the server devices 104 of the network traffic management system 100 in this example includes processor(s), a memory, and a communication interface, which are coupled together by a bus or other communication link, although other numbers or types of components could be used. The server devices 104 in this example can include application servers or database servers, for example, although other types of server devices 104 can also be included in the network traffic management system 100.

Accordingly, in some examples, one or more of the server devices 104 process login and other requests received from the client devices 106 via the communication network(s) 110 according to the HTTP-based application RFC protocol, for example. A web application may be operating on one or more of the server devices 104 and transmitting data (e.g., files or web pages) to the client devices (e.g., via the network traffic management apparatus 102) in response to requests from the client devices 106. The server devices 104 may be hardware or software or may represent a system with multiple servers in a pool, which may include internal or external networks.

Although the server devices 104 are illustrated as single devices, one or more actions of each of the server devices 104 may be distributed across one or more distinct network computing devices that together comprise one or more of the server devices 104. Moreover, the server devices 104 are not limited to a particular configuration. Thus, the server devices 104 may contain network computing devices that operate using a master/slave approach, whereby one of the network computing devices of the server devices 104 operate to manage or otherwise coordinate operations of the other network computing devices. The server devices 104 may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 104 can operate within the network traffic management apparatus 102 itself rather than as a stand-alone server device 104 communicating with the network traffic management apparatus 102 via communication network(s) 110. In this example, the one or more of the server devices 104 operate within the memory of the network traffic management apparatus 102.

The client devices 106 of the network traffic management system 100 in this example include any type of computing device that can exchange network data, such as mobile, desktop, laptop, or tablet computing devices, virtual machines (including cloud-based computers), or the like. Each of the client devices 106 includes a processor, a memory, and a communication interface, which are coupled together by a bus or other communication link (not illustrated), although other numbers or types of components could also be used.

The client devices 106 may run interface applications, such as standard web browsers or standalone client applications. The interface applications may provide an interface to make requests for, and receive content stored on, one or more of the server devices 104. The client devices 106 may further include a display device, such as a display screen or touchscreen, or an input device, such as a keyboard for example (not illustrated).

Although the exemplary network traffic management system 100 with the network traffic management apparatus 102, server devices 104, client devices 106, central management device 108, and communication network(s) 110 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 100, such as the network traffic management apparatus 102, server devices 104, client devices 106, or central management device 108, for example, may be configured to operate as virtual instances on the same physical machine. In other words, one or more of the network traffic management apparatus 102, server devices 104, client devices 106, or central management device 108 may operate on the same physical device rather than as separate devices communicating through communication network(s) 110. Additionally, there may be more or fewer network traffic management apparatuses 102, client devices 106, server devices 104, or central management devices 108 than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples also may be embodied as one or more non-transitory computer readable media having instructions stored thereon, such as in the memory of the network traffic management apparatus 102 or the central management device 108, for one or more aspects of the present technology, as described and illustrated by way of the examples herein. The instructions in some examples include executable code that, when executed by one or more processors, such as the processor(s) of the network traffic management apparatus 102 or the central management device 108, cause the processors to carry out steps necessary to implement the methods of the examples of this technology that are described and illustrated herein.

An exemplary method of controlling access to configuration data in a multi-admin system will be described with reference to FIGS. 1-5. Referring more specifically to FIG. 5, a flow diagram of an example method 500 of securely modifying a configuration in a multi-admin decentralized system is illustrated. In step 502 in this example, the central management device 108 of the network traffic management system 100 associates each administrative role with a key pair. As previously described above with respect to FIGS. 1 and 2, the central management device 108 includes a role management module 210 that can define one or more administrative accounts associated with particular predefined administration roles and/or domains. The central management device 108 can associate a pair of encryption keys that include a private key and a public key with each administration role.

In step 504, the central management device 108 and the network traffic management apparatus 102 can exchange security certificates and/or public keys. As described previously above, this exchange can occur following a discovery process. For each of the administrative accounts/roles created at the central management device 108 for which a key pair was generated and/or assigned, the central management device 108 will transmit each public key of the key pair to the network traffic management apparatus 102 for storage. The private key will remain stored on the central management device 108 and only the associated administrator role, user and/or device will have access to it. In some embodiments, the central management device 108 may provide an indication of the domain with which each public key is associated, for example such as but not limited to, a Configuration Object ID. The network traffic management apparatus 102 can store each public key in a secure location. For example, the network traffic management apparatus 102 may store each public key in an entry of a data storage structure, such as for example, a key metadata storage structure 318 that corresponds to an entry of a configuration data storage structure 314 that is associated with the domain that is associated with the public key. Alternatively, instead of storing the public key itself in the data storage structure, the public key can be stored elsewhere and the storage structure may instead store a pointer to the public key.

In step 506, the central management device 108 can receive a new configuration data input from an administrator. For example, security administrator 1 may write a new configuration for security policy 1. The new configuration data can represent an initially created set of configuration data for a new configuration object or it can represent a modification to a currently existing set of configuration data already stored by the network traffic management apparatus 102.

In step 508, the central management device 108 will calculate a digest value of the new configuration data, such as an MD5 digest for example, and encrypt the digest value using the private key of the corresponding administrator role who created the new configuration data. For instance, following along with the example described above, the digest value of the new configuration for security policy 1 will be encrypted by the central management device 108 using the private key of security administrator 1. As security administrator 1 is the only one who has access to this private key, it can be assured that the new security configuration used to create the digest that is then encrypted using the security administrator 1's private key was created by security administrator 1 and not someone else.

In step 510, the central management device 108 will transmit the new configuration data and the encrypted digest to the network traffic management apparatus 102. In some examples, the new configuration data that is transmitted could also be encrypted using the private key of the corresponding administrator role. However, it will be understood by those of skill in the art that encrypted data is much more bulky than unencrypted data, and therefore in some examples it may be desirable to leave the new configuration data unencrypted to reduce the costs of data transmission and storage.

In step 512, the network traffic management apparatus 102 receives the new configuration data and encrypted digest value from the central management device 108. Prior to storing the new configuration data, the network traffic management apparatus 102 will authenticate that the data was actually sent from the administrator it purports to have been sent by. In other words, continuing the example from above, when the network traffic management apparatus 102 receives new configuration data purporting to be configuration data for security policy 1 that was written by security administrator 1, the network traffic management apparatus 102 can first verify that this data was in fact sent from security administrator 1 (as opposed to an imposter) and that the configuration data has not been altered in transit prior to being received by the network traffic management apparatus 102.

As a part of the authentication process, the network traffic management apparatus 102 determines a calculated digest value for the received configuration data. The network traffic management apparatus 102 also decrypts the encrypted digest value using a stored public key that corresponds to the administrator role or domain associated with the new configuration data. For instance, following along with the previously described example, based on the fact that the received new configuration data relates to security policy 1, the network traffic management apparatus 102 would access the entry in the configuration metadata storage structure 316 corresponding to security policy 1 and would then, based on the device key ID listed in the entry, access the associated public key stored in the corresponding entry of the key metadata storage structure 318 for use in decrypting the received digest. In some examples, instead of having an additional data storage structure for the key metadata, the public key (or a pointer thereto) could be stored in the configuration metadata storage structure 316. The network traffic management apparatus 102 will then compare the calculated digest value to the decrypted digest value to determine whether they match or whether they are different.

In step 514, the network traffic management apparatus 102 will determine whether to accept or reject the new configuration data based on the results of the authentication process. Specifically, if the calculated digest value does not match the decrypted digest value then the network traffic management apparatus 102 will reject the new configuration data as that indicates that either the data has been tampered with or was not originally encrypted with the corresponding private key (and thus was sent from an imposter). However, if the two digest values match, then it indicates that the new configuration data was in fact sent by the administrator who is authorized to modify the configuration data relating to this particular domain. In this case, the network traffic management would store the new configuration data in, for example, the Configuration field(s) of the configuration data storage structure 314 and/or the configuration metadata storage structure 316, and would also store the received digest that was encrypted of with the private key of the associated administrator of the central management device 108 in the configuration metadata storage structure 316, which can be used in the future to detect any unauthorized changes to the configuration data.

Thus, as described above, if an administrator attempted to modify configuration data that is under the domain of another administrator, the system would detect this unauthorized change because the digest values would not match and the changes would be rejected. In this way, the system can provide controlled access to modifying configuration data based on preauthorized administrator roles.

In some examples, for additional layers of security, and/or following receipt of any new configuration data, the network traffic management apparatus 102 can calculate and store an additional digest value of the received configuration data that is then encrypted using a public key of the network traffic management apparatus 102. Thus, in some cases, the configuration metadata storage structure 316 would store two digests of the configuration data—one that is encrypted with the private key of the administrator who created the configuration data and one that is encrypted using the public key of the network traffic management system 100. This provides an added layer of protection to account for a case in which a local user of the network traffic management apparatus 102 has access to the configuration metadata storage structure 316 and/or key metadata storage structure 318 and could potentially manually alter some of the entries (e.g., the stored public key of the administrator and/or the stored digest) to make it appear as though a change to a configuration file was legitimate when it was not. In other words, in addition to the network traffic management system 100 using the stored private key of the administrator to decrypt the first stored and encrypted digest value to verify that the configuration data was created by the proper administrator, the network traffic management apparatus 102 can also then use a stored private key of the network traffic management apparatus 102 to decrypt the second stored and encrypted digest value to verify that a local user of the network traffic management apparatus 102 was not able to manually change the configuration data and the associated metadata to circumvent the verification process that uses the stored private key of the administrator. To make this determination, both decrypted digest values will match a calculated digest value of the configuration data stored in the configuration data storage structure 314. In the case where the second digest value does not match the others, it can be surmised that a manual change to the configuration data structure and/or metadata storage structure has been made and the configuration data can be recovered from a previous version. The private key of the network traffic management apparatus 102 would be stored in a location where no user would be able to access or view it, and thus it would not be possible to subvert the protection provided by the additionally stored digest value.

In some examples, a further layer of security can be added by encrypting the entirety of the configuration metadata storage structure 316 using the public key of the network traffic management apparatus 102. This would prevent a local user with access to the configuration metadata storage structure 316 from making manual changes to the data. As described above, the encryption of the configuration metadata storage structure 316 can then be decrypted using the private key of the network traffic management apparatus 102 when legitimate changes are to be made to the data. According to some examples, the decryption of the configuration metadata storage structure 316 can occur in response to the network traffic management apparatus 102 determining that a valid change to configuration data has been submitted (i.e., that a received digest value when decrypted using the corresponding stored administrator public key matches a calculated digest value of the received configuration data) or when some other operation of the system requires it, such as checking the validity of the data upon bootup (or in response to another prompt) or accessing configuration data stored in the configuration metadata storage structure 316 to restore a previous configuration setting.

Figure 5:
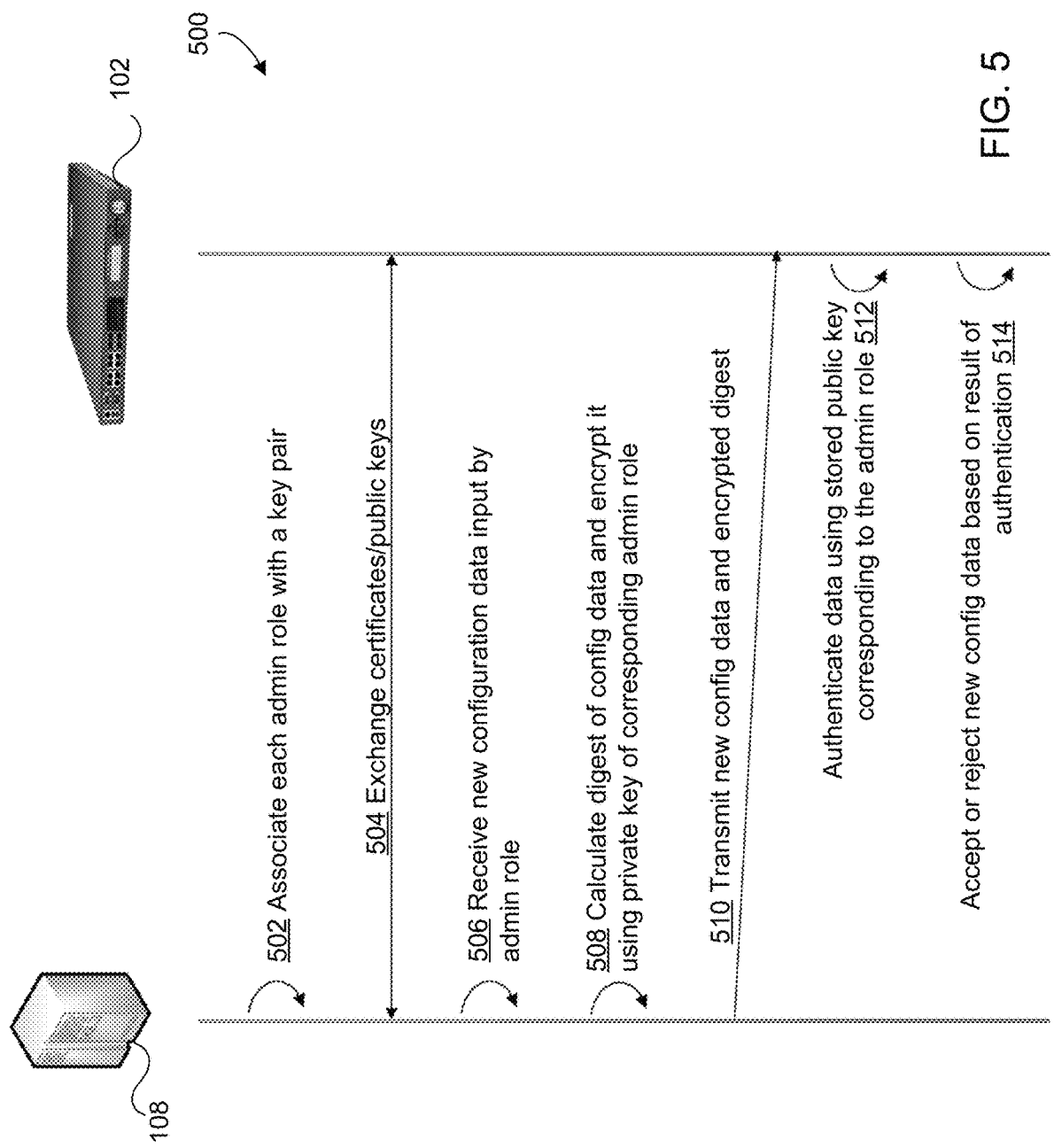
FIG. 5 is a flow diagram of an exemplary method for securely modifying a configuration in a multi-admin decentralized system.
Figure 6:
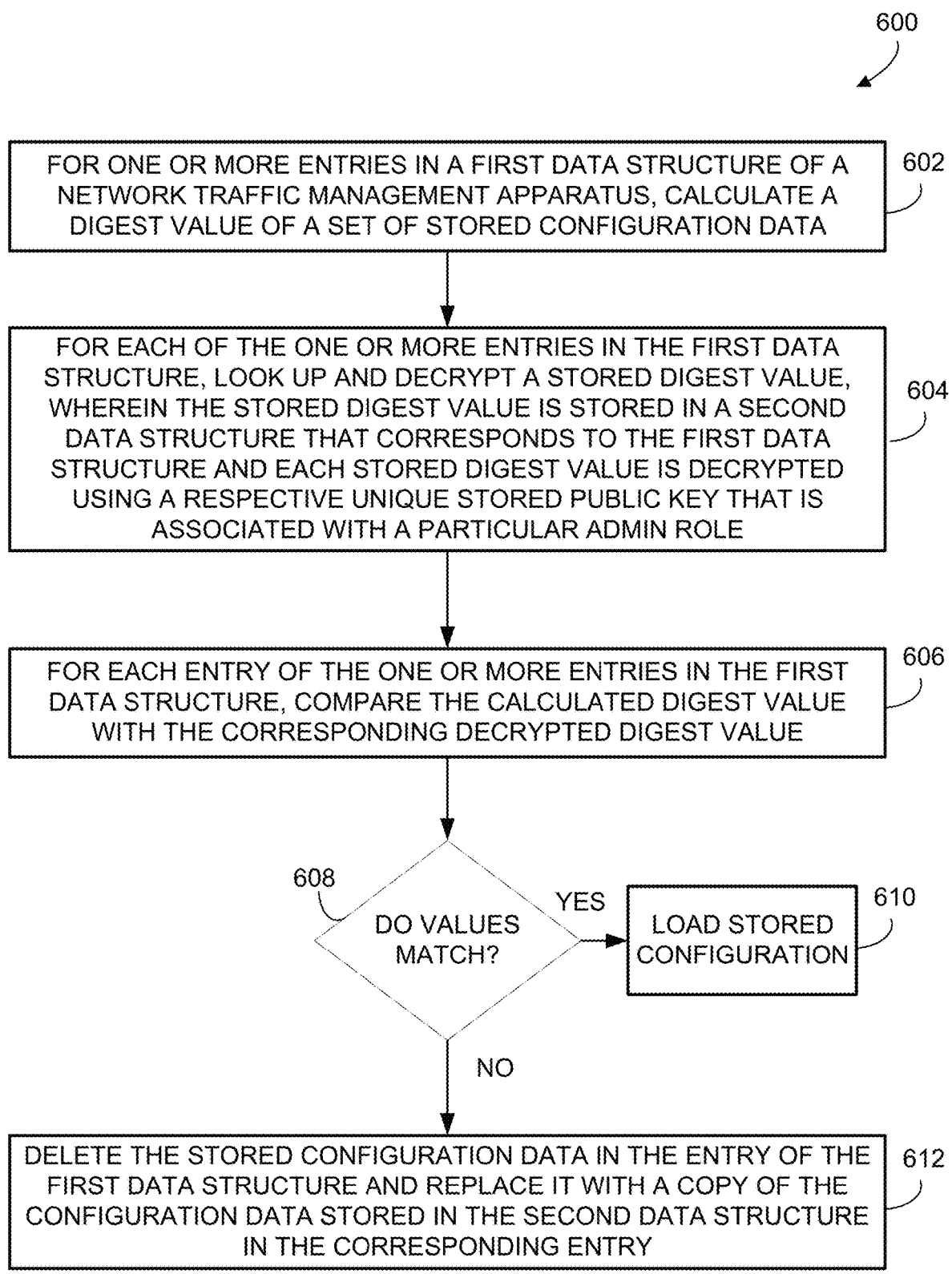
FIG. 6 is a flowchart of an exemplary method for securely loading a configuration in a multi-admin decentralized system.

Although FIG. 5 depicts a process of an administrator of the central management device 108 submitting new configuration data to be stored in the network traffic management apparatus 102, it should be understood that it is contemplated that a similar process would be used for when an administrator of the network traffic management apparatus 102 wants to submit new configuration data. The only difference would be that the new configuration data and encrypted digest would not need to be sent from a remote device, but rather would be submitted locally (e.g., via a configuration management module 214 of the network traffic management apparatus 102), but it would otherwise be submitted and accepted/rejected in the same way.

It is important to note that one or more users with access to the network traffic management apparatus 102, such as system administrators, may have direct access to the configuration data storage structure 314 and/or the configuration metadata storage structure 316. An unauthorized manual modification of configuration data in the configuration data storage structure 314 made by such a user can also be detected and discarded by the system in accordance with the method described with reference to FIG. 6 below.

An exemplary method of controlling access to configuration data in a multi-admin system will now be described with reference to FIGS. 1-4 and 6. Referring more specifically to FIG. 6, an example of a method 600 of securely loading a configuration in a multi-admin decentralized system is illustrated. In step 602 in this example, the network traffic management apparatus 102 of the network traffic management system 100 calculates a digest value of a set of stored configuration data for one or more entries in a first data structure of the network traffic management system 100. For instance, using the example shown in FIG. 4A, the network traffic management apparatus 102 would calculate a digest value (e.g., an MD5 value) for one or more of each of Security_policy_1, Network_config_1 and Security_policy_2 that are stored in the configuration data storage structure 314.

In step 604, the network traffic management apparatus 102 looks up and decrypts a stored digest value for each of the one or more entries in the first data structure. For each, the stored digest value is stored in a second data structure that corresponds to the first data structure and each stored digest value is decrypted using a respective unique stored public key that is associated with a particular administrative role. For instance, following along with the prior example, the network traffic management apparatus 102 can look up each of the stored digest values digest(SP1), digest(NC1) and digest(SP2) stored in the configuration metadata storage structure 316 that correspond to the configuration data entries Security_policy_1, Network_config_1 and Security_policy_2 stored in the configuration data storage structure 314, respectively. Further, using the associated Device Key IDs, the network traffic management apparatus 102 can then look up the corresponding stored public keys pubCMD, pubNTMA1 and pubCMD2 from the key metadata storage structure 318 and use them to decrypt the respective digest values.

In step 606, the network traffic management apparatus 102 compares the calculated digest value for each of the one or more entries in the first data structure with the corresponding decrypted digest value described above.

In step 608, the network traffic management apparatus 102 determines whether each calculated digest value matches the corresponding decrypted digest value. If the values do match, then in step 610, the network traffic management apparatus 102 loads the stored configuration for execution from the configuration data storage structure 314. If the values do not match, that indicates that there has been an unauthorized change to the stored configuration data and so in step 612, the network traffic management apparatus 102 deletes the stored configuration data in the entry of the first data structure and replaces it with a copy of the configuration data. In some examples, the copy of the stored configuration data can be stored in the second data structure in a corresponding entry. In other examples, the copy of the stored configuration data can be stored in another location of the network traffic management apparatus 102, such as another storage structure that tracks and stores each version of configuration data as it is changed over time.

Figure 7:
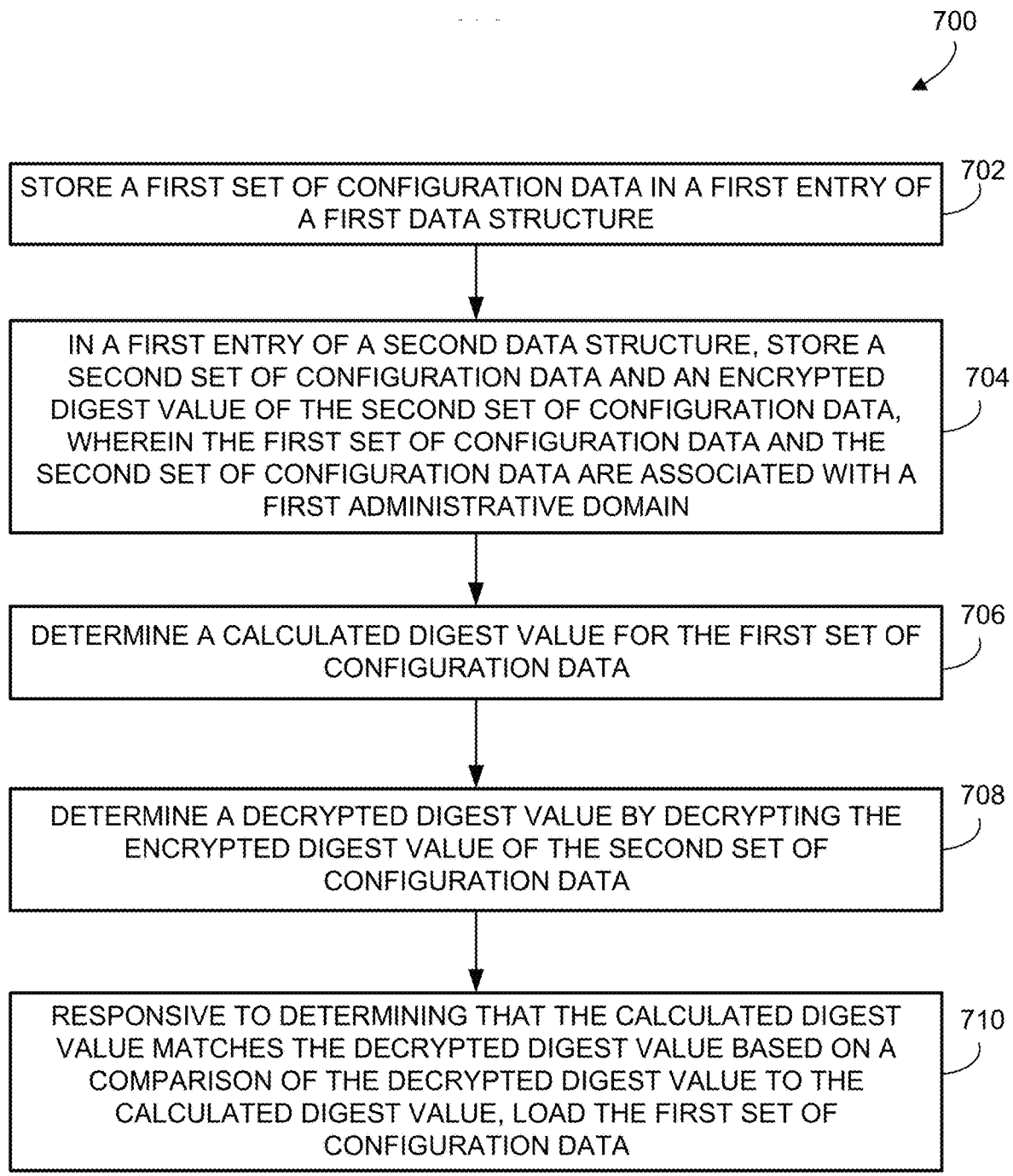
FIG. 7 is a flowchart of an exemplary method for securely loading a configuration in a multi-admin decentralized system.

An exemplary method of controlling access to configuration data in a multi-admin system will now be described with reference to FIGS. 1-4 and 7. Referring more specifically to FIG. 7, an example of a method 700 of securely loading a configuration in a multi-admin decentralized system is illustrated. In step 702 in this example, the network traffic management apparatus 102 of the network traffic management system 100 stores a first set of configuration data in a first entry of a first data structure. For instance, using the example shown in FIG. 4A, the network traffic management apparatus 102 would store the first set of configuration data (e.g., Security_policy_1) in a first entry of the configuration data storage structure 314.

The network traffic management apparatus 102 may also store a first public key that is associated with a first administrator role of the central management device 108. The first administrator role is associated with the first administrative domain. For example, if the first administrative domain is "Security Policies," then the first administrator role may be an individual or device that is authorized to modify security policies. In some embodiments, the first public key may be stored in a data storage structure such as key metadata storage structure 318, whereas in other embodiments the first public key may be stored in the configuration metadata storage structure 316. Prior to storing the first public key, the network traffic management apparatus 102 receives the first public key from the central management device 108, for example during an exchange of public keys as described above with respect to step 504 of FIG. 5.

In step 704, the network traffic management apparatus 102 stores a second set of configuration data and an encrypted digest value of the second set of configuration data. The first set of configuration data and the second set of configuration data are both associated with a first administrative domain. For example, using the example shown in FIG. 4B, the network traffic management apparatus 102 would store the second configuration data (e.g., Security_policy_1) in an entry of the configuration metadata storage structure 316 that corresponds to the same administrative domain as the first set of configuration data (e.g., sec1 and/or the security policy 1 domain). Thus, while stored in separate data structures, the first set of configuration data corresponds to the second set of configuration data, as they are both purported to be configuration data for the same administrative policy (e.g., Security Policy 1). The first data structure is a public data structure that may be viewable by all users of the system, whereas the second data structure is a metadata structure that is hidden from the majority of users and may require special knowledge or security privileges to access. This allows the configuration data to be both publicly viewable/accessible in the first data storage structure but also securely stored in the second data storage structure to avoid tampering from unauthorized users.

The encrypted digest value of the second set of configuration data was encrypted at the central management device 108 using a first private key associated with the first administrator role.

In step 706, the network traffic management apparatus 102 determines a calculated digest value for the first set of configuration data. In some embodiments, the digest value may be determined by calculating an MD5 value based on the first set of configuration data.

In step 708, the network traffic management apparatus 102 determines a decrypted digest value by decrypting the encrypted digest value of the second set of configuration data. The encrypted digest value is decrypted using the first public key stored by the network traffic management apparatus 102 to determine the decrypted digest value.

In step 710, the network traffic management apparatus 102 loads the first set of configuration data in response to determining that the calculated digest value matches the decrypted digest value based on a comparison of the decrypted digest value to the calculated digest value.

However, if the network traffic management apparatus 102 determines that the calculated digest value does not match the decrypted digest value based on the comparison of the decrypted digest value to the calculated digest value, then the network traffic management apparatus 102 may instead delete and replace the first set of configuration data in the first entry of the first data structure with a copy of the second set of configuration data from the first entry of the second data structure.

The method 700 may further include receiving a request to modify a configuration, where the request to modify the configuration includes new configuration data and a new encrypted digest value. If the request is coming from an authorized user, the encrypted digest value will have been encrypted at the central management device 108 using the first private key associated with the first administrator role.

Thus, the network traffic management apparatus 102 will determine the authenticity of the request to modify the configuration by determining a new calculated digest value based on the new configuration data (e.g., calculating an MD value) and determining a new decrypted digest value by decrypting the new encrypted digest value using the stored first public key associated with the first administrator role and comparing the values. If the new calculated digest value matches the new decrypted digest value, then the network traffic management apparatus 102 will determine that the request is authentic and will store the new configuration data by replacing both the first set of configuration data in the first entry of the first data structure and the second set of configuration data in the first entry of the second data structure with the new configuration data. However, if the values don't match, the network traffic management apparatus 102 will reject and ignore the request to modify the configuration.

With this technology, secure controlled access of shared configuration in a role-based, multi-administrator distributed (or centralized) system can be achieved. The system can advantageously allow for the public display and copying of configuration data, while ensuring that only authorized administrators are able to modify the configuration data. The system allows for an administrator of a central management device 108 to remotely submit modifications to configuration data that are authenticated and stored on another device. The system can include further security to detect and/or prevent manual modifications to configuration data made by a local user of the network traffic management apparatus 102. Further, in the event such a manual modification has been made, the system can advantageously detect the unauthorized change and restore the data to the previous version.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for controlling access to configuration data in a multi-admin system, the method implemented by one or more network traffic management apparatuses, central management devices, server devices, or client devices, the method comprising:
   storing a first set of configuration data in a first entry of a first data structure;
   in a first entry of a second data structure, storing a second set of configuration data and an encrypted digest value of the second set of configuration data, wherein the first set of configuration data and the second set of configuration data are associated with a first administrative role associated with a first administrative domain;
   determining a calculated digest value for the first set of configuration data;
   encrypting the calculated digest value using a first private key associated with the first administrator role, wherein the first set of configuration data is created by the first administrator role;
   determining a decrypted digest value by decrypting the encrypted digest value of the second set of configuration data; and
   responsive to determining that the calculated digest value matches the decrypted digest value based on a comparison of the decrypted digest value to the calculated digest value, loading the first set of configuration data.

2. The method of claim 1, further comprising storing a first public key associated with the first administrator role of a central management device, wherein the first public key is received from the central management device.

3. The method of claim 2, wherein decrypting the encrypted digest value comprises using the first public key to decrypt the encrypted digest value.

4. The method of claim 1, further comprising responsive to determining that the calculated digest value does not match the decrypted digest value based on the comparison of the decrypted digest value to the calculated digest value, deleting and replacing the first set of configuration data in the first entry of the first data structure with a copy of the second set of configuration data from the first entry of the second data structure.

5. The method of claim 1, further comprising:
   receiving a request to modify a configuration, the request comprising new configuration data and a new encrypted digest value;
   determining a new calculated digest value based on the new configuration data;
   determining a new decrypted digest value by decrypting the new encrypted digest value; and
   responsive to determining an authenticity of the request to modify the configuration by comparing the new calculated digest value to the new decrypted digest value, storing or rejecting the new configuration data.

6. A network traffic management apparatus, comprising memory comprising programmed instructions stored thereon and one or more processors configured to be capable of executing the stored programmed instructions to:
   store a first set of configuration data in a first entry of a first data structure;
   in a first entry of a second data structure, store a second set of configuration data and an encrypted digest value of the second set of configuration data, wherein the first set of configuration data and the second set of configuration data are associated with a first administrative role associated with a first administrative domain;
   determine a calculated digest value for the first set of configuration data;
   encrypt the calculated digest value using a first private key associated with the first administrator role, wherein the first set of configuration data is created by the first administrator role;
   determine a decrypted digest value by decrypting the encrypted digest value of the second set of configuration data; and
   responsive to determining that the calculated digest value matches the decrypted digest value based on a comparison of the decrypted digest value to the calculated digest value, load the first set of configuration data.

7. The network traffic management apparatus of claim 6, wherein the processors are further configured to be capable of executing the stored programmed instructions to store a first public key associated with the first administrator role of a central management device, wherein the first public key is received from the central management device.

8. The network traffic management apparatus of claim 7, wherein decrypting the encrypted digest value comprises using the first public key to decrypt the encrypted digest value.

9. The network traffic management apparatus of claim 6, wherein the processors are further configured to be capable of executing the stored programmed instructions to, responsive to determining that the calculated digest value does not match the decrypted digest value based on the comparison of the decrypted digest value to the calculated digest value, delete and replace the first set of configuration data in the first entry of the first data structure with a copy of the second set of configuration data from the first entry of the second data structure.

10. The network traffic management apparatus of claim 6, the processors are further configured to be capable of executing the stored programmed instructions to:
receive a request to modify a configuration, the request comprising new configuration data and a new encrypted digest value;
determine a new calculated digest value based on the new configuration data;
determine a new decrypted digest value by decrypting the new encrypted digest value; and
responsive to determining an authenticity of the request to modify the configuration by comparing the new calculated digest value to the new decrypted digest value, store or reject the new configuration data.

11. A non-transitory computer readable medium having stored thereon instructions for workload processing comprising executable code that, when executed by one or more processors, causes the processors to:
store a first set of configuration data in a first entry of a first data structure;
in a first entry of a second data structure, store a second set of configuration data and an encrypted digest value of the second set of configuration data, wherein the first set of configuration data and the second set of configuration data are associated with a first administrative role associated with a first administrative domain;
determine a calculated digest value for the first set of configuration data;
encrypt the calculated digest value using a first private key associated with the first administrator role, wherein the first set of configuration data is created by the first administrator role;
determine a decrypted digest value by decrypting the encrypted digest value of the second set of configuration data; and
responsive to determining that the calculated digest value matches the decrypted digest value based on a comparison of the decrypted digest value to the calculated digest value, load the first set of configuration data.

12. The non-transitory computer readable medium of claim 11, wherein the executable code, when executed by the processors further causes the processors to store a first public key associated with the first administrator role of a central management device, wherein the first public key is received from the central management device.

13. The non-transitory computer readable medium of claim 12, wherein decrypting the encrypted digest value comprises using the first public key to decrypt the encrypted digest value.

14. The non-transitory computer readable medium of claim 11, wherein the executable code, when executed by the processors further causes the processors to, responsive to determining that the calculated digest value does not match the decrypted digest value based on the comparison of the decrypted digest value to the calculated digest value, delete and replace the first set of configuration data in the first entry of the first data structure with a copy of the second set of configuration data from the first entry of the second data structure.

15. The non-transitory computer readable medium of claim 11, wherein the executable code, when executed by the processors further causes the processors to:
receive a request to modify a configuration, the request comprising new configuration data and a new encrypted digest value;
determine a new calculated digest value based on the new configuration data;
determine a new decrypted digest value by decrypting the new encrypted digest value; and
responsive to determining an authenticity of the request to modify the configuration by comparing the new calculated digest value to the new decrypted digest value, store or reject the new configuration data.

16. A network traffic management system, comprising one or more network traffic management apparatuses, central management devices, server devices, or client devices with memory comprising programmed instructions stored thereon and one or more processors configured to be capable of executing the stored programmed instructions to:
store a first set of configuration data in a first entry of a first data structure;
in a first entry of a second data structure, store a second set of configuration data and an encrypted digest value of the second set of configuration data, wherein the first set of configuration data and the second set of configuration data are associated with a first administrative role associated with a first administrative domain;
determine a calculated digest value for the first set of configuration data;
encrypt the calculated digest value using a first private key associated with the first administrator role, wherein the first set of configuration data is created by the first administrator role;
determine a decrypted digest value by decrypting the encrypted digest value of the second set of configuration data; and
responsive to determining that the calculated digest value matches the decrypted digest value based on a comparison of the decrypted digest value to the calculated digest value, load the first set of configuration data.

17. The network traffic management system of claim 16, wherein the processors are further configured to be capable of executing the stored programmed instructions to store a first public key associated with the first administrator role of a central management device, wherein the first public key is received from the central management device.

18. The network traffic management system of claim 17, wherein decrypting the encrypted digest value comprises using the first public key to decrypt the encrypted digest value.

19. The network traffic management system of claim 16, wherein the processors are further configured to be capable of executing the stored programmed instructions to responsive to determining that the calculated digest value does not match the decrypted digest value based on the comparison of the decrypted digest value to the calculated digest value, delete and replace the first set of configuration data in the first entry of the first data structure with a copy of the second set of configuration data from the first entry of the second data structure.

20. The network traffic management system of claim 16, the processors are further configured to be capable of executing the stored programmed instructions to:
receive a request to modify a configuration, the request comprising new configuration data and a new encrypted digest value;
determine a new calculated digest value based on the new configuration data;
determine a new decrypted digest value by decrypting the new encrypted digest value; and
responsive to determining an authenticity of the request to modify the configuration by comparing the new calculated digest value to the new decrypted digest value, store or reject the new configuration data.

\* \* \* \* \*